(12) United States Patent
Howes et al.

(10) Patent No.: US 11,383,633 B1
(45) Date of Patent: Jul. 12, 2022

(54) RATCHET DEVICE

(71) Applicant: Cottrell, Inc., Gainesville, GA (US)

(72) Inventors: Phillip Bryan Howes, Braselton, GA (US); Matt Rahm, Buford, GA (US)

(73) Assignee: Cottrell Incorporated, Gainesville, GA (US)

( * ) Notice: Subject to any disclaimer, the term of this patent is extended or adjusted under 35 U.S.C. 154(b) by 189 days.

(21) Appl. No.: 16/919,668

(22) Filed: Jul. 2, 2020

Related U.S. Application Data

(63) Continuation-in-part of application No. 16/707,375, filed on Dec. 9, 2019, now abandoned.

(60) Provisional application No. 62/776,897, filed on Dec. 7, 2018.

(51) Int. Cl.
*B60P 7/08* (2006.01)
*F16M 13/02* (2006.01)

(52) U.S. Cl.
CPC ............. *B60P 7/083* (2013.01); *F16M 13/02* (2013.01)

(58) Field of Classification Search
CPC ................................ B60P 7/083; F16M 13/02
See application file for complete search history.

(56) References Cited

U.S. PATENT DOCUMENTS

| | | | | |
|---|---|---|---|---|
| 4,339,969 A | * | 7/1982 | Hage ..................... | B25B 13/463 81/57.39 |
| 4,723,757 A | * | 2/1988 | Steinman ................. | B66D 3/14 254/369 |
| 5,271,606 A | * | 12/1993 | Kamper .................. | B60P 7/083 254/217 |
| 6,007,053 A | * | 12/1999 | Huang .................... | B60P 7/083 254/223 |
| 7,444,718 B1 | * | 11/2008 | Chang ..................... | B60P 7/083 24/68 CD |
| 2003/0084550 A1 | * | 5/2003 | Fang ....................... | B60P 7/083 24/68 CD |
| 2014/0008480 A1 | * | 1/2014 | Kingery .................. | B60P 7/083 242/389 |
| 2019/0255984 A1 | * | 8/2019 | Kingery ................ | B60P 7/0823 |
| 2019/0366905 A1 | * | 12/2019 | Persson ................ | A61G 3/0808 |

* cited by examiner

*Primary Examiner* — David M Upchurch
(74) *Attorney, Agent, or Firm* — Smith Tempel Blaha LLC; Matthew T. Hoots

(57) ABSTRACT

A ratcheting device according to the solution comprises a rotatable cogwheel comprising a plurality of teeth, a spring-loaded primary pawl, a spring-loaded handle pawl, a handle comprising a handle pawl disengagement lever, a handle pawl disengagement plate and a primary pawl disengagement plate. The primary pawl disengagement plate is mechanically coupled to the handle such that the handle may be rotated around the cogwheel to a point that the primary pawl disengagement plate contacts the spring-loaded primary pawl and causes it to disengage from the cogwheel. At the same time that the primary pawl is disengaged from the cogwheel teeth by the primary pawl disengagement plate, the handle pawl is similarly disengaged from the cogwheel teeth via contact with a handle pawl disengagement plate. Advantageously, the ratcheting device may be transitioned between a ratcheting state and a free-to-rotate state with only a single hand of the user and without requiring the handle to travel beyond a 180-degree arc of motion.

5 Claims, 15 Drawing Sheets

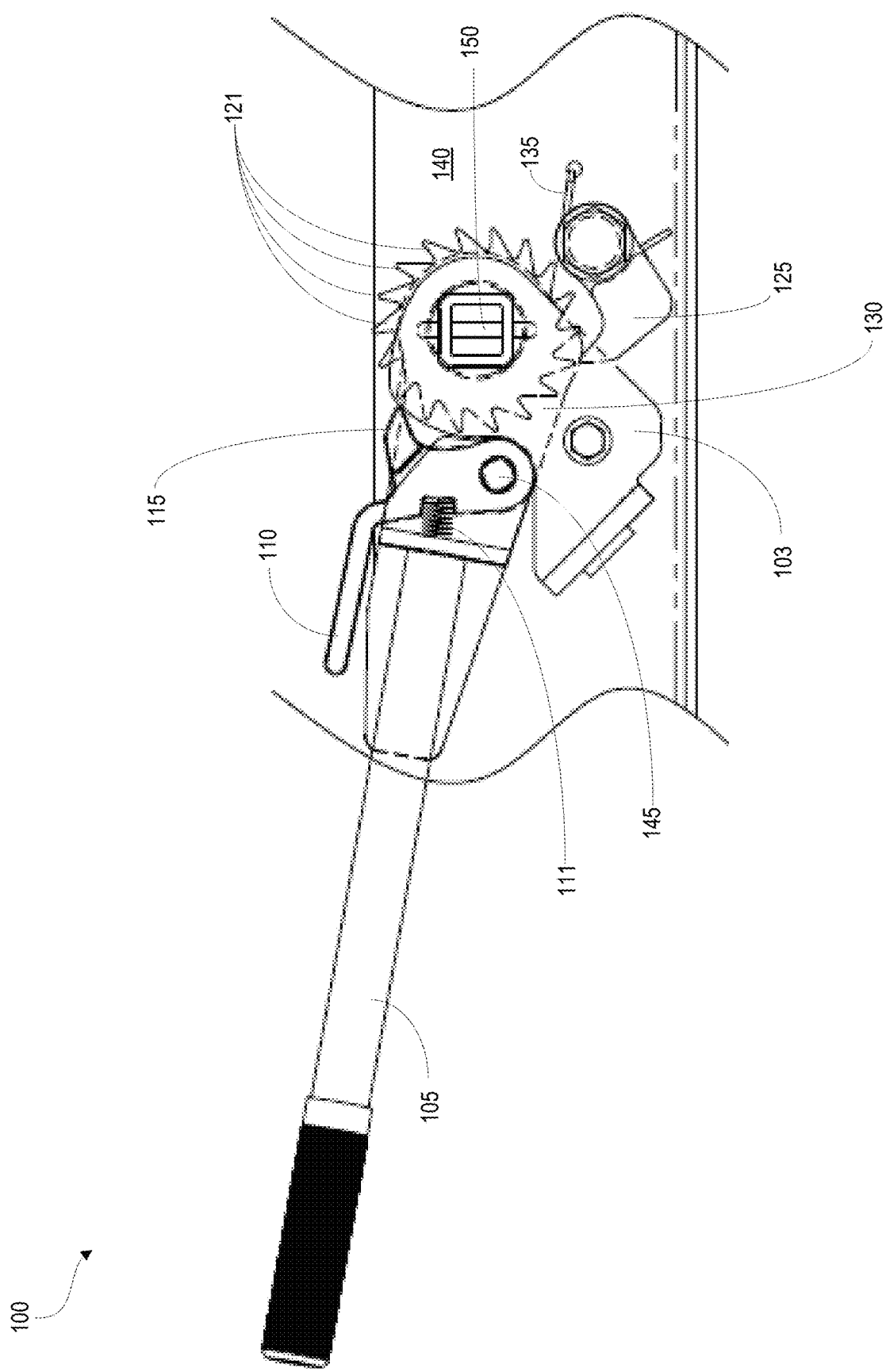

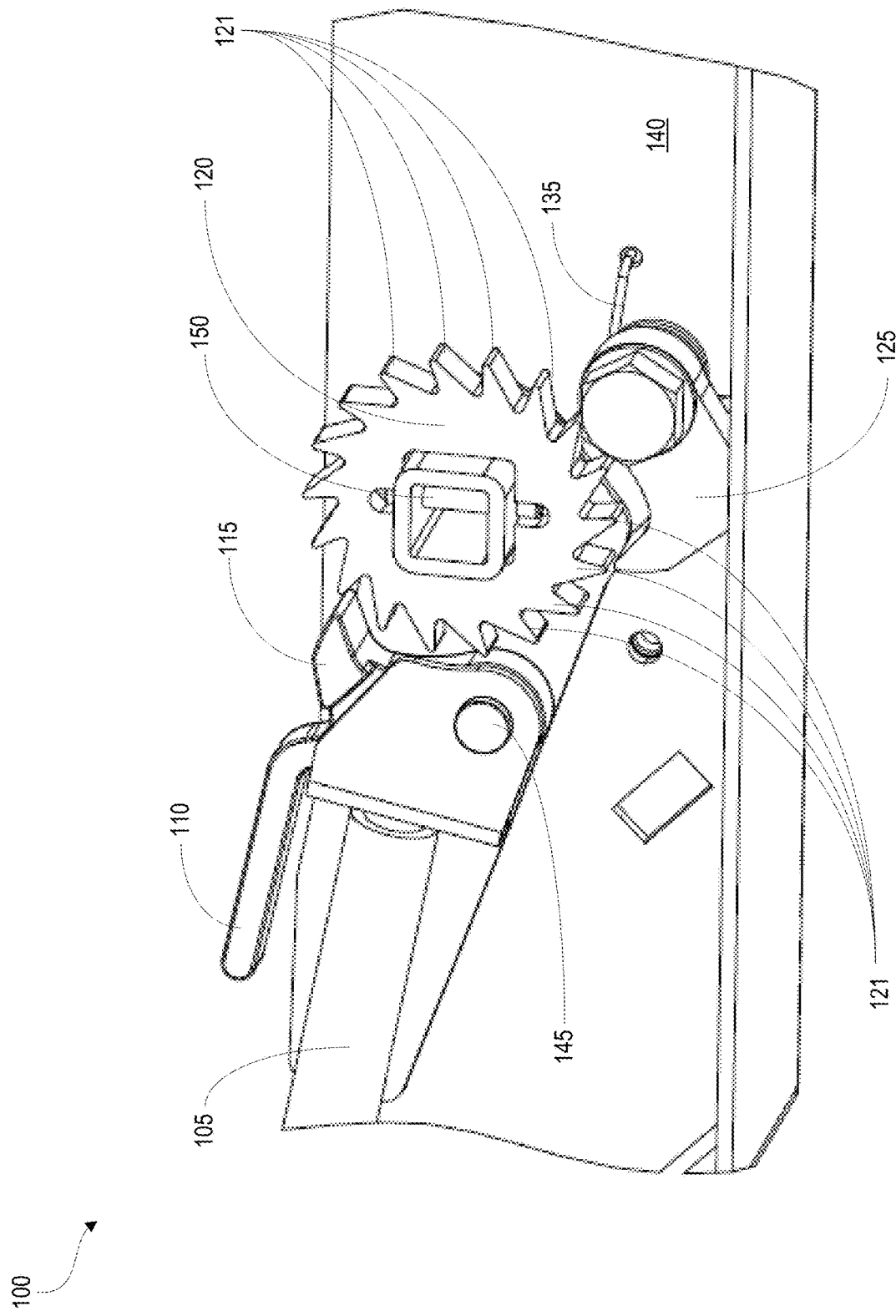

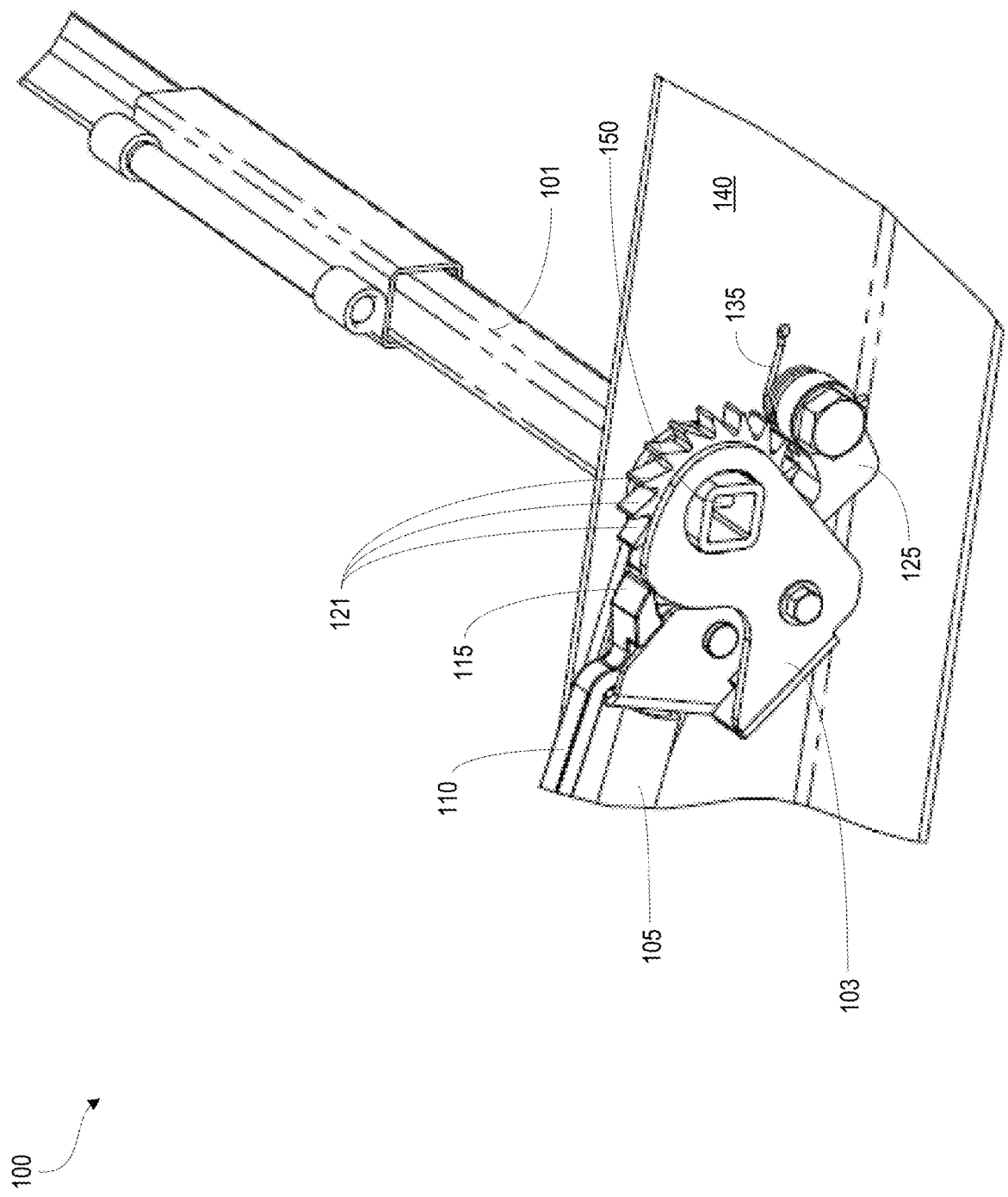

RATCHET DEVICE

PRIORITY AND RELATED APPLICATIONS STATEMENT

This application is a continuation-in-part of the U.S. non-provisional application entitled "RATCHET DEVICE", filed on Dec. 9, 2019 and assigned application Ser. No. 16/707,375, which claimed priority under 35 U.S.C. § 119(e) to U.S. provisional application entitled "RATCHET DEVICE AND RETRACTING STEP SYSTEM," filed on Dec. 7, 2018 and assigned application Ser. No. 62/776,897. The entire contents of both application Ser. Nos. 16/707,375 and 62/776,897 are hereby incorporated by reference.

BACKGROUND

Prior art ratchet devices may pose space limitations less than optimal for some car-carrying applications due to the need for a user to access disengagement mechanisms in order to transition the ratchet device between a free-to-rotate state for loosening a strap and a ratcheting state for tightening a strap. Mounting prior art ratchet devices on a car-carrying application in a tight space, or in a visually streamlined location (such as in a recessed space only accessible from an opening in a top deck of the car-carrying application) may not always be ideal.

Therefore, there is a need in the art for a ratchet device that may be transitioned between its free-to-rotate state and its ratcheting state without requiring a user to physically access and actuate any mechanism of the ratchet device other than its handle. Embodiments of the solution provide for a streamlined ratchet device configured to be transitioned between a free-to-rotate state and a ratcheting state with a user's single hand, thereby fulfilling the above need in the art, as well as other needs in the art.

SUMMARY

The present solution relates to a streamlined ratchet device. Embodiments of the solution may be integrated into a single-car or multi-car flatbed or rollback vehicle (a "car-carrying application"), although other applications are envisioned. Exemplary embodiments of a streamlined ratchet device may be configured to reside within a narrow compartment along the edge of a car-carrying application such that exposure of the ratchet device is minimized when not in use. As would be understood and expected by one of ordinary skill in the art, the ratchet device may be configured to tighten and loosen a tensioning device (e.g., a strap) for securing cargo, such as an automobile, on a car-carrying application. Advantageously, embodiments of the ratchet device solution may be configured for operation within a 180-degree range of motion and may comprise a pawl disengagement plate integrated with the handle such that the primary pawl may be easily disengaged from the cogwheel teeth for loosening the strap.

An exemplary embodiment of a ratcheting device according to the solution comprises a rotatable cogwheel comprising a plurality of teeth. A spring-loaded primary pawl is positioned to engage the plurality of teeth of the rotatable cogwheel such that, when the spring-loaded primary pawl is engaged with the plurality of teeth of the rotatable cogwheel, the ratcheting device is in a ratcheting state; and when the spring-loaded primary pawl is disengaged from the plurality of teeth of the rotatable cogwheel, the ratcheting device is in a free-to-rotate state. A spring-loaded handle pawl is also positioned to engage the plurality of teeth of the rotatable cogwheel. A handle comprises a handle pawl disengagement lever, wherein actuation of the handle pawl disengagement lever causes the spring-loaded handle pawl to disengage from the plurality of teeth of the rotatable cogwheel. And, a handle pawl disengagement plate comprising a handle pawl disengagement feature is also associated with the handle such that when the handle is rotated around the cogwheel, the primary pawl disengagement feature of the primary pawl disengagement plate contacts the spring-loaded primary pawl and causes it to disengage from the plurality of teeth of the rotatable cogwheel while the handle pawl disengagement feature of the handle pawl disengagement plate contacts the spring-loaded handle pawl and causes it to also disengage from the plurality of teeth of the rotatable cogwheel. When both the handle pawl and the primary pawl are disengaged from the cogwheel, the ratcheting device is in a free-to-rotate state that allows for a shaft anchored to the cogwheel to be rotated in a direction that loosens any tensioning device anchored to the shaft.

The exemplary embodiment may further comprise a back plate configured for mounting the ratcheting device to a structure. A spring operable to cause the spring-loaded handle pawl to engage the plurality of teeth of the rotatable cogwheel may be configured to reside substantially within the handle. Advantageously, to transition the exemplary ratcheting device from its ratcheting state to its free-to-rotate state may be accomplished without rotating the handle beyond a 180-degree arc. The exemplary ratcheting device may further comprise a rotatable shaft mechanically engaged to the cogwheel such that a longitudinal axis of the rotatable shaft is substantially perpendicular to a plane defined by the cogwheel. The rotatable shaft may be configured to receive a strap, chain, rope, cable or some other flexible tensioning device.

BRIEF DESCRIPTION OF THE DRAWINGS

In the figures, like reference numerals refer to like parts throughout the various views unless otherwise indicated. For reference numerals with letter character designations such as "121A" or "121B," the letter character designations may differentiate two like parts or elements present in the same figure and, depending on context, may be used to orient the reader by relating one exemplary like part of a plurality of like parts to a second exemplary like part of the plurality of like parts. Letter character designations for reference numerals may be omitted when it is intended that a reference numeral to encompass all parts having the same reference numeral in all figures.

FIG. 1A is depicted with hidden lines, FIG. 1B is depicted without hidden lines, and FIG. 1C is depicted with the handle pawl disengagement plate removed;

FIG. 2A is depicted with hidden lines, FIG. 2B is depicted without hidden lines, and FIG. 2C is depicted with the handle pawl disengagement plate removed;

FIG. 3A is depicted with hidden lines, FIG. 3B is depicted without hidden lines, and FIG. 3C is depicted with the handle pawl disengagement plate removed;

FIG. 4A is depicted with hidden lines, FIG. 4B is depicted without hidden lines, and FIG. 4C is depicted with the handle pawl disengagement plate removed; and FIGS. 5A-5C illustrate the exemplary embodiment of the ratchet device illustrated in FIG. 1 in a fully disengaged, free-to-rotate state, where FIG. 5A is depicted with hidden lines, FIG. 5B is depicted without hidden lines, and FIG. 5C is depicted with the handle pawl disengagement plate removed.

DETAILED DESCRIPTION

Figure 1A:
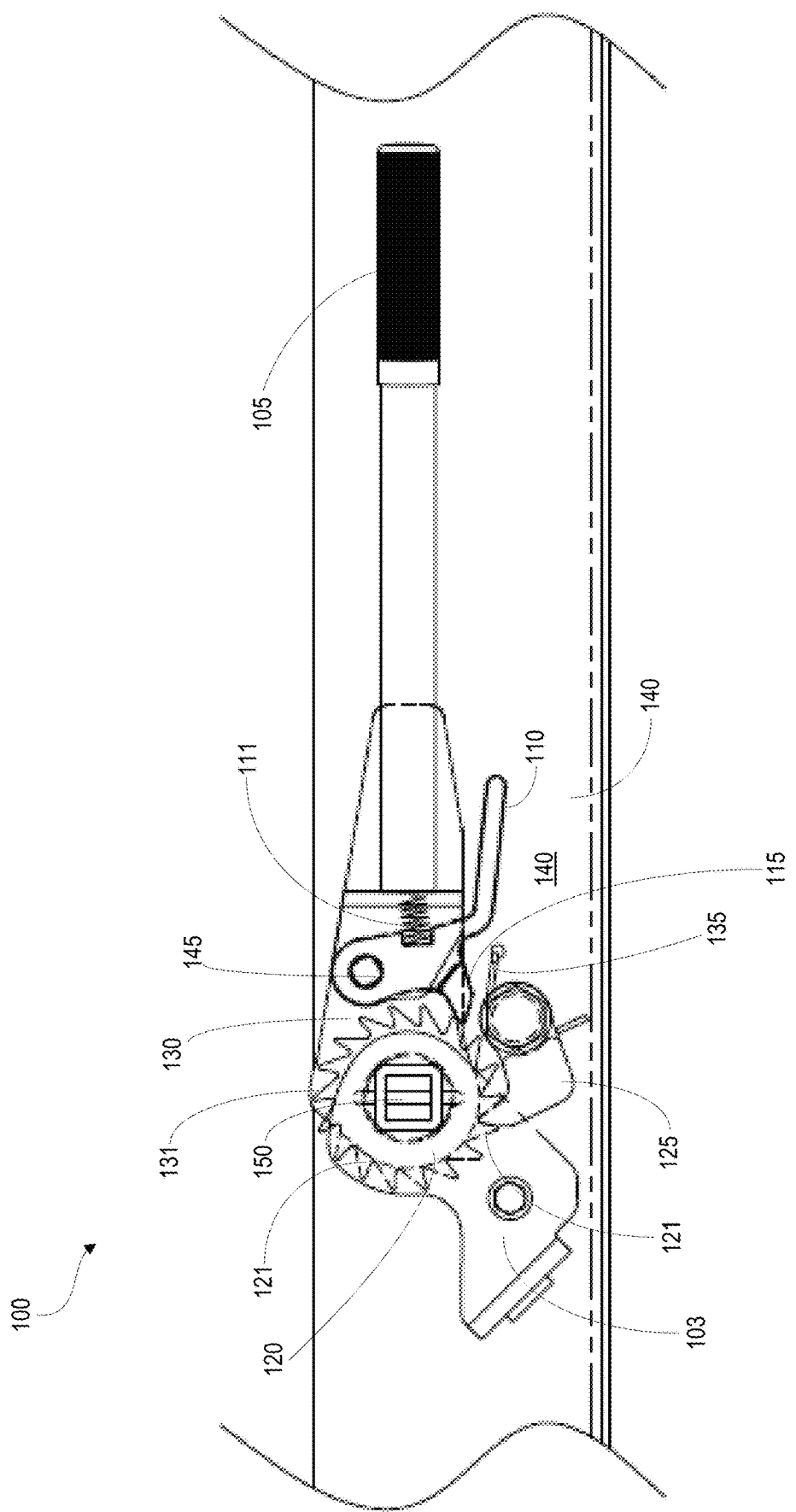
FIGS. 1A-1C illustrate an exemplary embodiment of the ratchet device according to the solution in a transport state, where

Exemplary embodiments of a streamlined ratchet device may be configured to reside within a narrow compartment along the edge of a car-carrying application such that exposure of the ratchet device is minimized when not in use. As would be understood and expected by one of ordinary skill in the art, the ratchet device may be configured to tighten and loosen a flexible tensioning member, such as a strap or cable or the like, for securing cargo, such as an automobile, on a car-carrying application. Advantageously, embodiments of the ratchet device solution may be configured for operation within a 180-degree range of motion and may comprise a pawl disengagement plate integrated with the handle such that a cam feature of the pawl disengagement plate is operable to disengage the primary pawl from the cogwheel teeth for loosening the tensioning member. Moreover, embodiments may further comprise a handle pawl disengagement plate with a cam feature similarly operable to disengage the handle pawl from the cogwheel teeth for loosening the tensioning member. Embodiments of the ratchet device solution will become better understood from a review of the attached figures and the following description.

When a ratchet device according to the solution is installed within a narrow compartment along the edge of a car-carrying application, exposure of the ratchet device is advantageously minimized when not in use (i.e., when in a transport state) thereby creating a visually streamlined look to the car-carrying application as well as protecting the ratchet device. A rotatable shaft mechanically engaged to, and driven by, the ratchet device is positioned and used for tightening a tensioning member (such as a tie-down strap) that extends through the deck of a car-carrying application. The rotatable shaft may be exposed beneath the deck of the car-carrying application for receiving a tensioning member, as would be understood by one of ordinary skill in the art. The ratchet device according to the solution may be actuated within a 180-degree arc and then stored in a transport state within the compartment.

FIGS. 1-5 illustrate an exemplary embodiment of the ratchet device 100 according to the solution, shown in use from a transport state to a ratcheting state to a free-to-rotate state. Notably, the description of the exemplary embodiment of the solution that follows makes use of directional terms such as "clockwise" and "counterclockwise" and "upward" and "downward" and "lowered" and the like, in order to orient the reader for ease of review and understanding of the figures. Use of these directional terms will not limit the scope of the solution or otherwise suggest that embodiments of the solution must have components that are restricted to a specific directional movement. Rather, it is envisioned that other embodiments of the solution may be configured, or oriented in application, for different directional movements than those that are shown and described herein in reference to the exemplary embodiment.

Figure 1B:
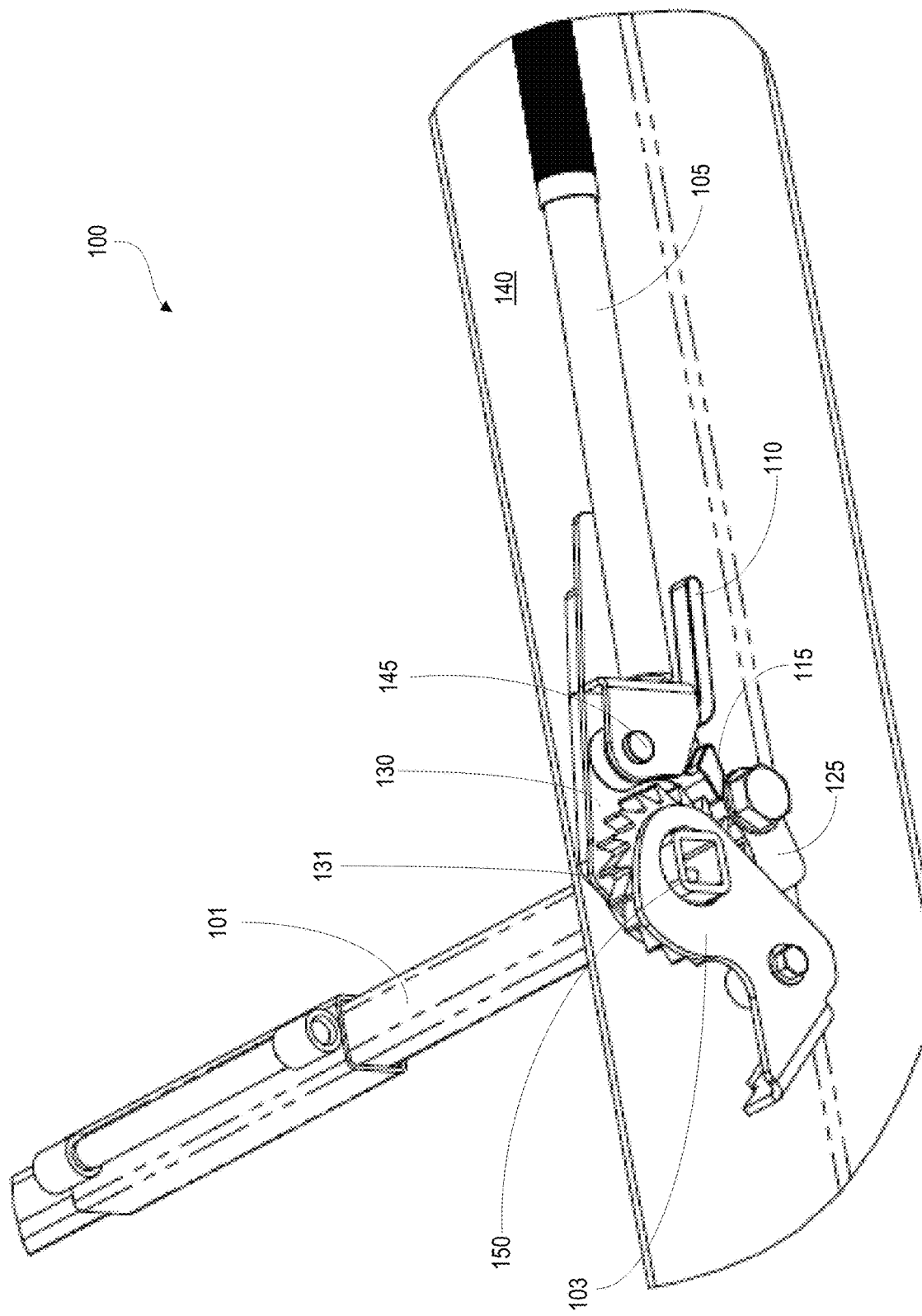
Figure 1C:
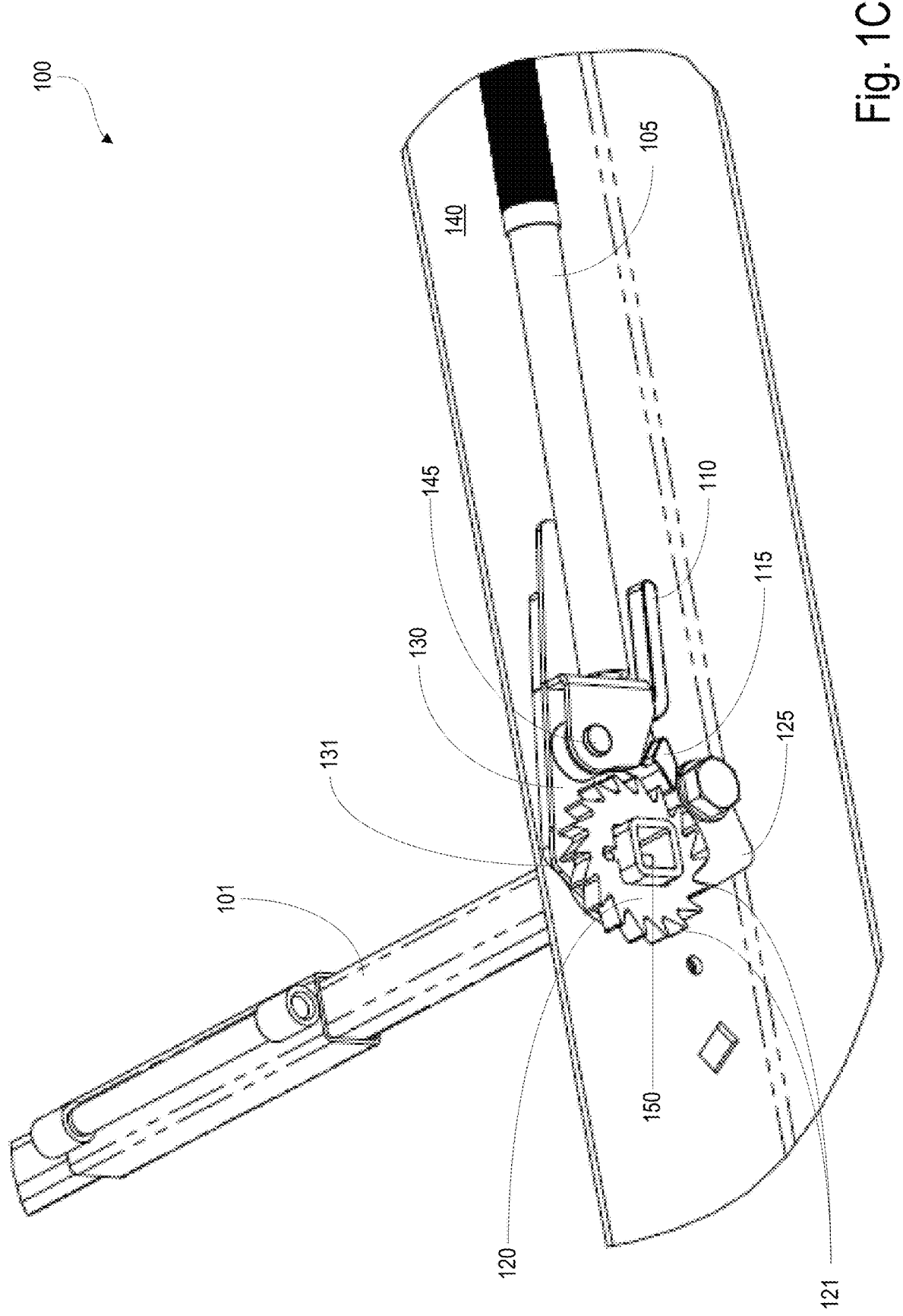

Beginning with FIG. 1, illustrated is an exemplary embodiment of the ratchet device 100 according to the solution in a transport state, where FIG. 1A is depicted with hidden lines, FIG. 1B is depicted without hidden lines, and FIG. 1C is depicted with the handle pawl disengagement plate 103 removed. The ratchet device 100 includes a pair of pawls—a handle pawl 115 and a primary pawl 125. The ratchet device 100 also includes a pair of disengagement plates—a handle pawl disengagement plate 103 and a primary pawl disengagement plate 130, respectively associated with the handle pawl 115 and the primary pawl 125, each featuring a cam aspect configured to disengage its associated pawl from the teeth 121 of the cogwheel 120. The interaction and functionality of the pawls 115, 125 with the disengagement plates 103, 130 in order to transition the ratchet device 100 from one state to another will become better understood from the figures and description that follows.

As for the FIG. 1 illustrations, it can be understood that the ratchet device 100 is in a transport state, such as may be optimal for transport of cargo secured on the deck of a car-carrying application. The primary pawl 125 is fully engaged with a tooth 121 of the cogwheel 120, urged into engagement with the tooth via a force exerted by spring 135. The cogwheel 120 includes a square aperture in its center configured for receipt of a square shaft 101 (profiles other than square are envisioned for shaft 101 and will occur to persons of skill in the art). Because the primary pawl 125 is engaged with one of the teeth 121, the cogwheel 120 is prevented from a counterclockwise rotation that would loosen the tension of any tensioning member anchored around shaft 101. The handle 105 is in a lowered position with handle pawl 115 disengaged.

Figure 2A:
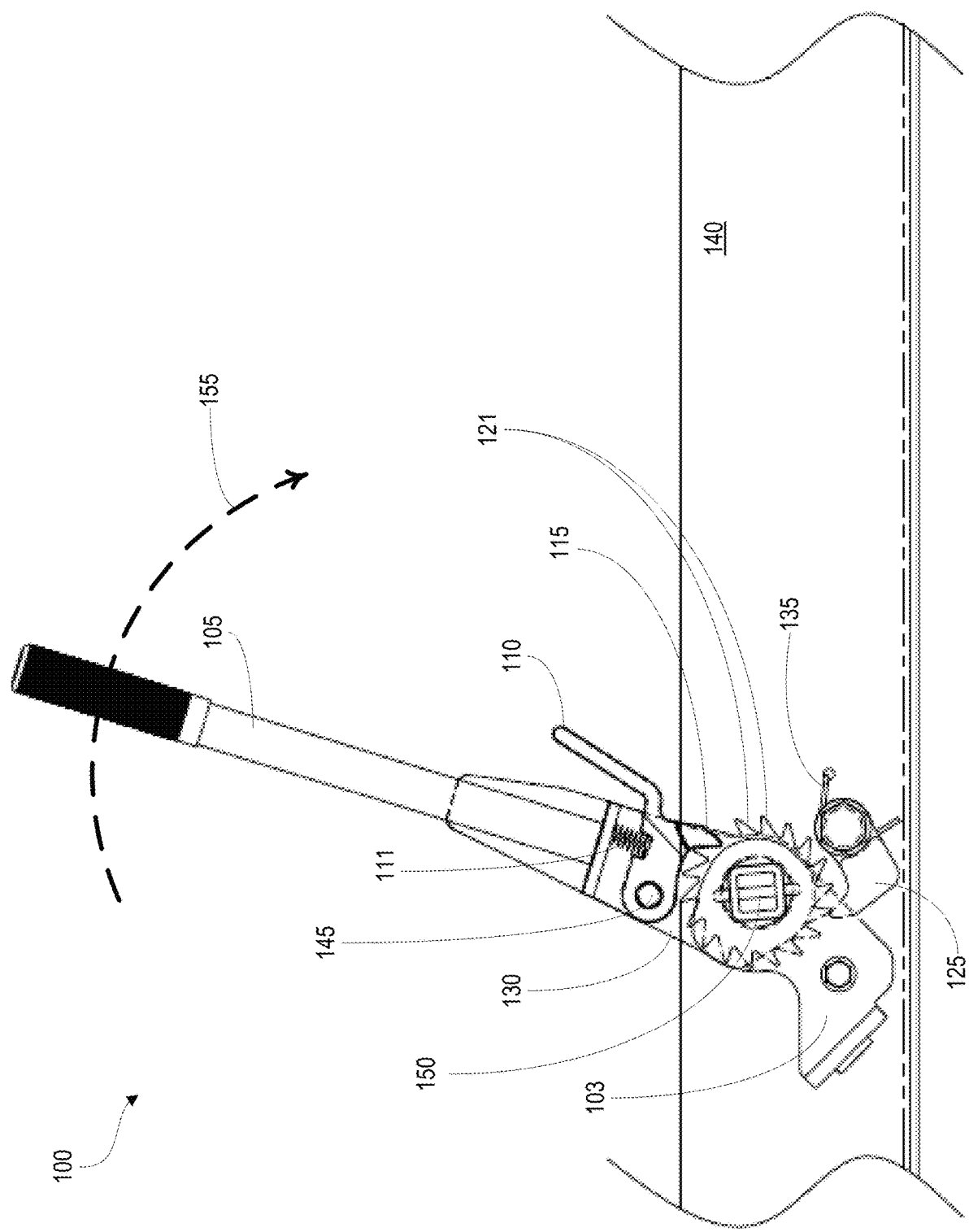
FIGS. 2A-2C illustrate the exemplary embodiment of the ratchet device illustrated in FIG. 1 in a ratcheting state, where
Figure 2B:
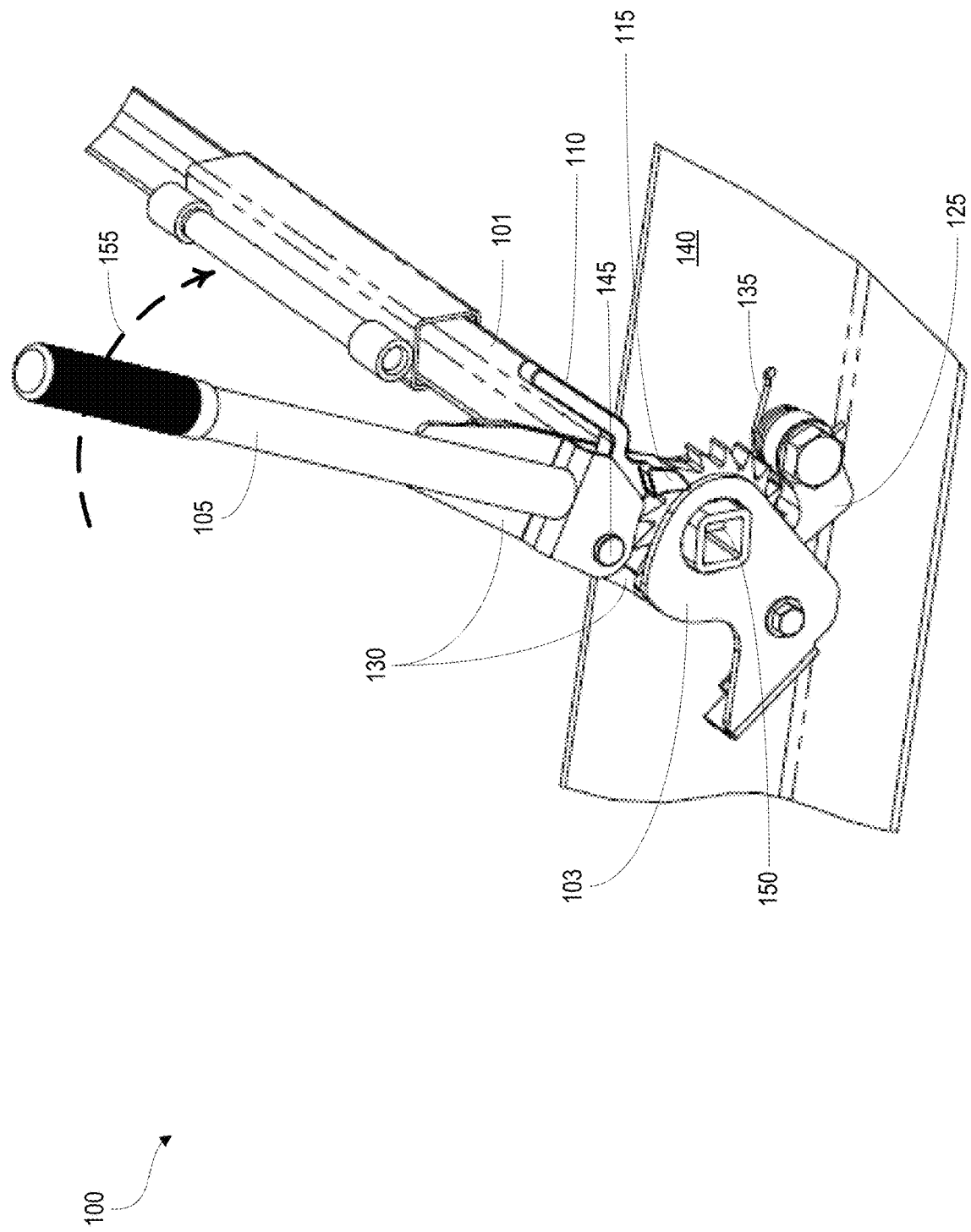
Figure 2C:
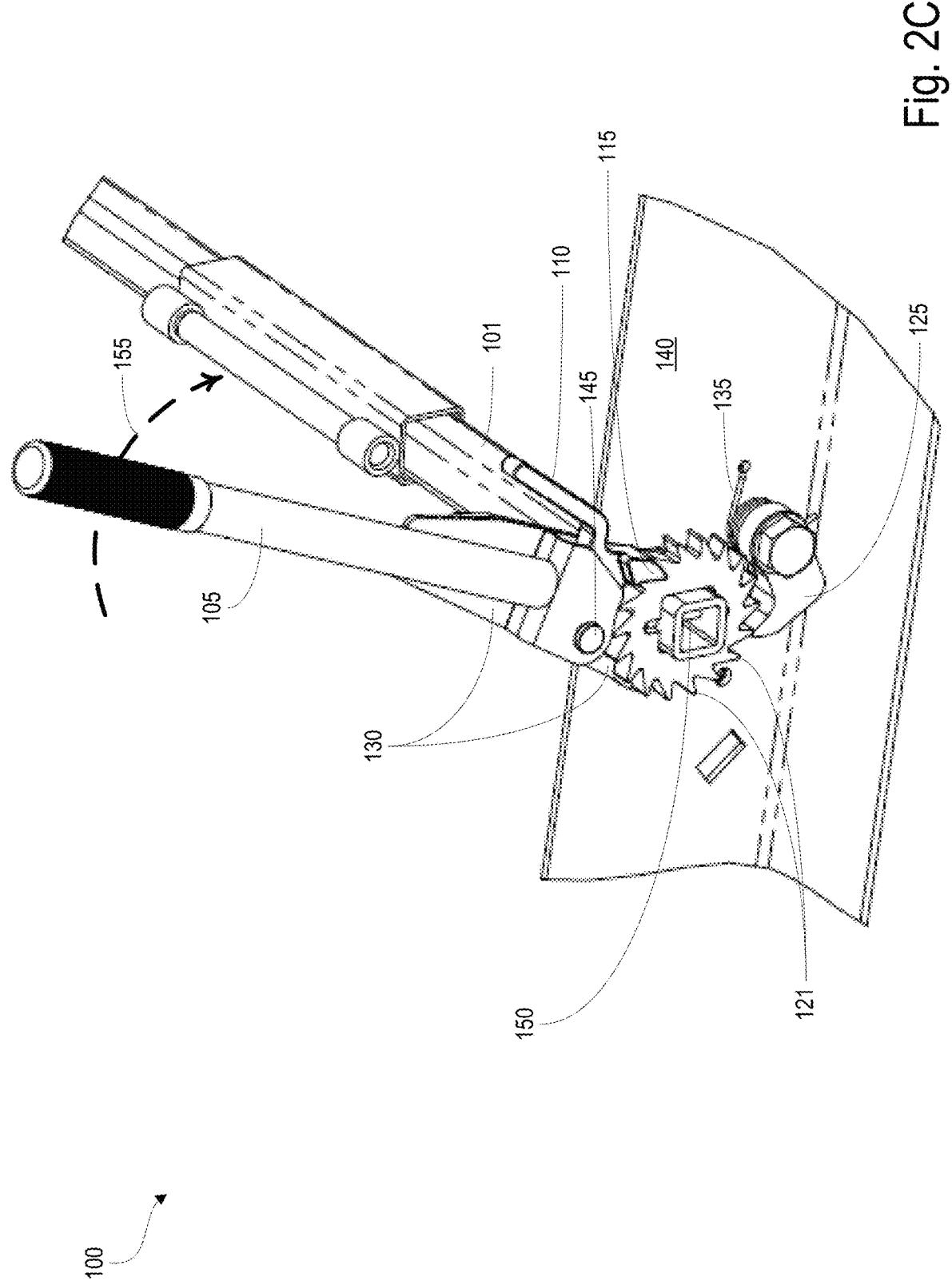

Turning now to FIG. 2, illustrated is the exemplary embodiment of the ratchet device illustrated in FIG. 1, shown in a ratcheting state, where FIG. 2A is depicted with hidden lines, FIG. 2B is depicted without hidden lines, and FIG. 2C is depicted with the handle pawl disengagement plate 103 removed. As can be seen in the FIGS. 2A-2C, the handle pawl 115 is in an engaged position with the teeth 121 of cogwheel 120 and the handle 105 is in a first, up position ready for application of a clockwise force 155. The handle pawl 115 is urged to engage the teeth 121 of cogwheel 120 by the force applied by a spring 111 in the handle. The primary pawl 125 is also urged to engage with the teeth 121 of the cogwheel 120 via a force exerted by spring 135 (it is envisioned that the spring 135 may be in the form of a torsion spring, an extension spring, a compression spring, or any other spring type properly applied to exert a force as described herein). As shown in the FIG. 2 illustrations, the primary pawl 125 is "stepping" over one of the teeth 121.

In this state, a clockwise force 155 applied to the handle 105 will turn the cogwheel 120 and cause the spring-loaded 135 primary pawl 125 to advance to the next tooth of the cogwheel 120. As the cogwheel 120 rotates clockwise, so too rotates the shaft 101 in order to tighten any flexible tensioning device anchored on shaft 101. That is, as would be understood by one of ordinary skill in the art, the rotatable shaft 101 (shown in FIGS. 2B-2C) may also turn clockwise when the cogwheel 120 is advanced clockwise by force 155 and thereby tighten a tensioning device, such as a strap, affixed thereto. The rotatable shaft 101 may be mechanically engaged to the ratchet device 100 at a central connection point 150 of the cogwheel 120 such that the longitudinal axis of the rotatable shaft is substantially perpendicular to a plane defined by the cogwheel 120. In this way, a force that rotates the cogwheel 120 will also rotate the rotatable shaft around its longitudinal axis.

The exemplary embodiment of the solution shown in all the figures includes a back plate 140. The various components comprised within the ratchet device 100 may be mounted on back plate 140. Back plate 140 may, in turn, be mounted to a structure such as a wall within a compartment comprised within the deck of a car-carrying application. Even so, it is envisioned that certain embodiments of the solution, such as the exemplary embodiment illustrated in the figures, may essentially include a back plate 140 that is formed by a surface of a structure that is part of car-carrying application or the like, as the ratchet device 100 may be integrated into the structure such that the structure itself (such as the wall of an interior compartment in the deck of a car-carrying application) functions as the back plate 140.

The handle 105 is mechanically engaged with a primary pawl disengagement plate 130 such that the primary pawl disengagement plate 130 is rotated when the handle 105 is rotated. Notably, although the exemplary embodiment of the solution illustrated in the figures includes a primary pawl disengagement plate 130 in the form of a flat, plate-like component, it is envisioned that other embodiments may leverage an arm-like feature or other feature taking a geometric form other than a plate and, as such, the scope of the solution will not be limited to include a primary pawl disengagement component, or for that matter a handle pawl disengagement component 103, in the form of a plate. The function and purpose of the pawl disengagement plates 103, 130 will become more apparent from the description of figures that follow.

Returning to the description of the FIG. 2 illustrations, the arrangement of the handle 105 and primary pawl disengagement plate 130 may further include a pivot feature 145 configured to allow for the handle disengagement lever 110 to be actuated such that the handle pawl 115 is either engaged with, or manually disengaged from, the teeth 121 of cogwheel 120. The default state of the handle pawl 115, without actuation of the handle disengagement lever 110, may be for the handle pawl 115 to be downwardly engaged to the teeth 121 of cogwheel 120 via a spring-loaded force from a spring 111 mounted within handle 105. In order for the handle 105 to be placed in the transport state (such as is depicted in the FIG. 1 illustrations), the handle pawl 115 may be disengaged from the teeth 121 of cogwheel 120 by a user actuating handle 110 and subsequently rotating handle 105 clockwise and down. Advantageously in such a situation, the primary pawl 125 may stay engaged with the teeth 121 of cogwheel 120, thereby preventing any counterclockwise movement of the rotatable shaft 101 that would loosen a tensioning member anchored thereto.

Notably, actuation of the handle disengagement lever 110, which causes handle pawl 115 to be disengaged from the teeth 121 of cogwheel 120, also allows for free, counterclockwise rotation of the handle 105 (and pawl disengagement plate 130) to a new position relative to the teeth 121 of cogwheel 120; however, it may not be necessary to actuate handle disengagement lever 110 in order to rotate the handle 105 and pawl disengagement plate 130 in a counterclockwise direction, as a counterclockwise force on handle 105 without actuation of the handle disengagement lever 110 may still cause handle pawl 115 to serially disengage and engage (i.e., "step over") teeth 121 of cogwheel 120.

When the ratcheting device 100 is in a ratcheting state, such as is depicted by the FIG. 2 illustrations, assertion of a clockwise force 155 on handle 105 without depressing handle disengagement lever 110 while the handle pawl 115 remains engaged with one of teeth 121 of cogwheel 120 will cause a clockwise rotation of the cogwheel 120 (as previously described). Simultaneously, primary pawl 125 advances to a next tooth (or teeth) 121 on cogwheel 120, serially stepping over and engaging teeth 121 by virtue of the force applied by spring 135. Advantageously, the primary pawl 125, when fully engaged with a tooth of cogwheel 120, prevents the cogwheel 120 from moving in a counterclockwise direction. Because cogwheel 120 is rotated clockwise, and primary pawl 125 advances to a next tooth (or teeth) of cogwheel 120, the rotatable shaft 101 that is mechanically engaged to the ratchet device 100 at a central connection point 150 also rotates clockwise and, thereby, tightens a strap affixed thereto.

Figure 3A:
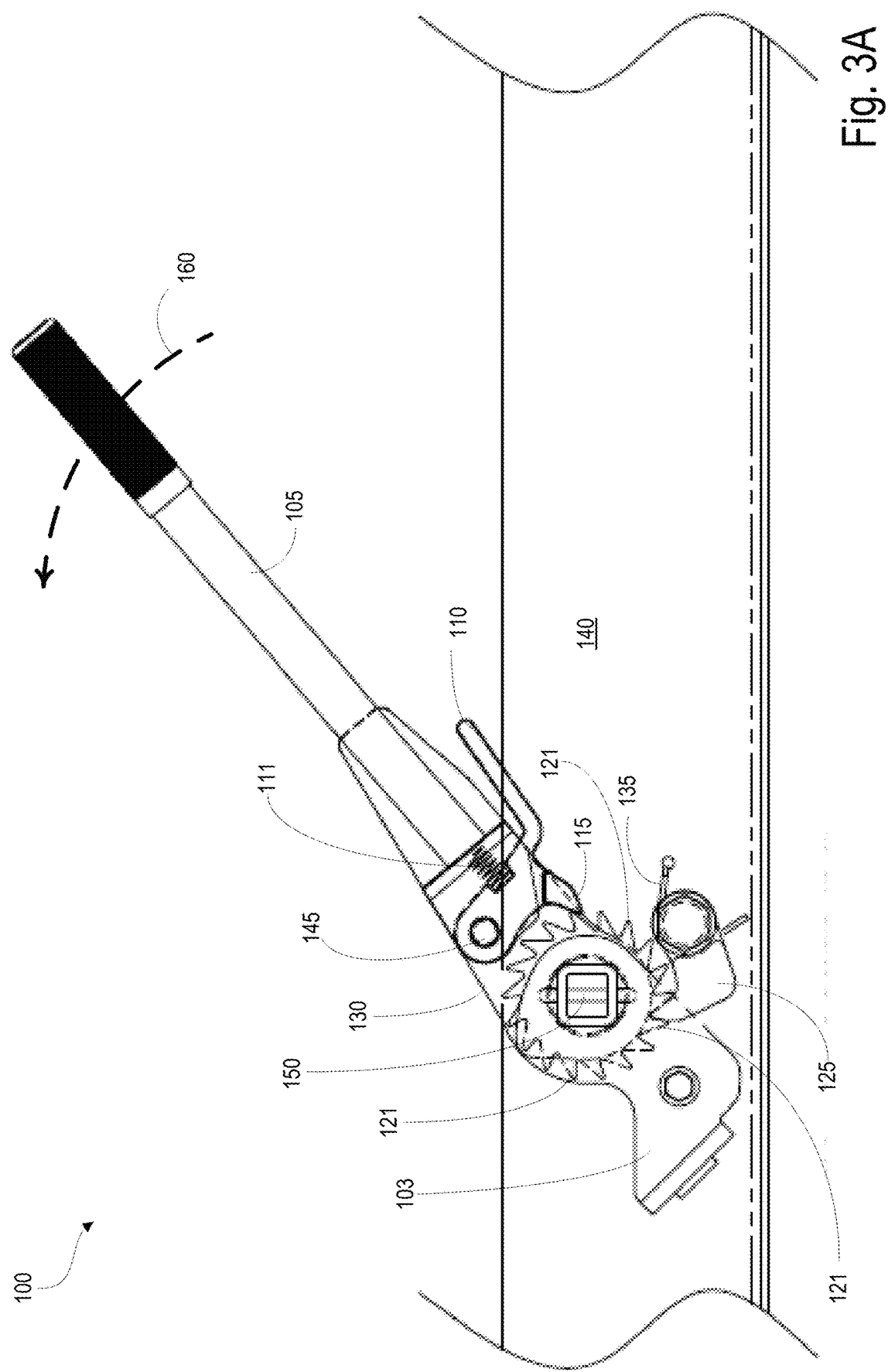
FIGS. 3A-3C illustrate the exemplary embodiment of the ratchet device illustrated in FIG. 1 in a repositioning state, where
Figure 3B:
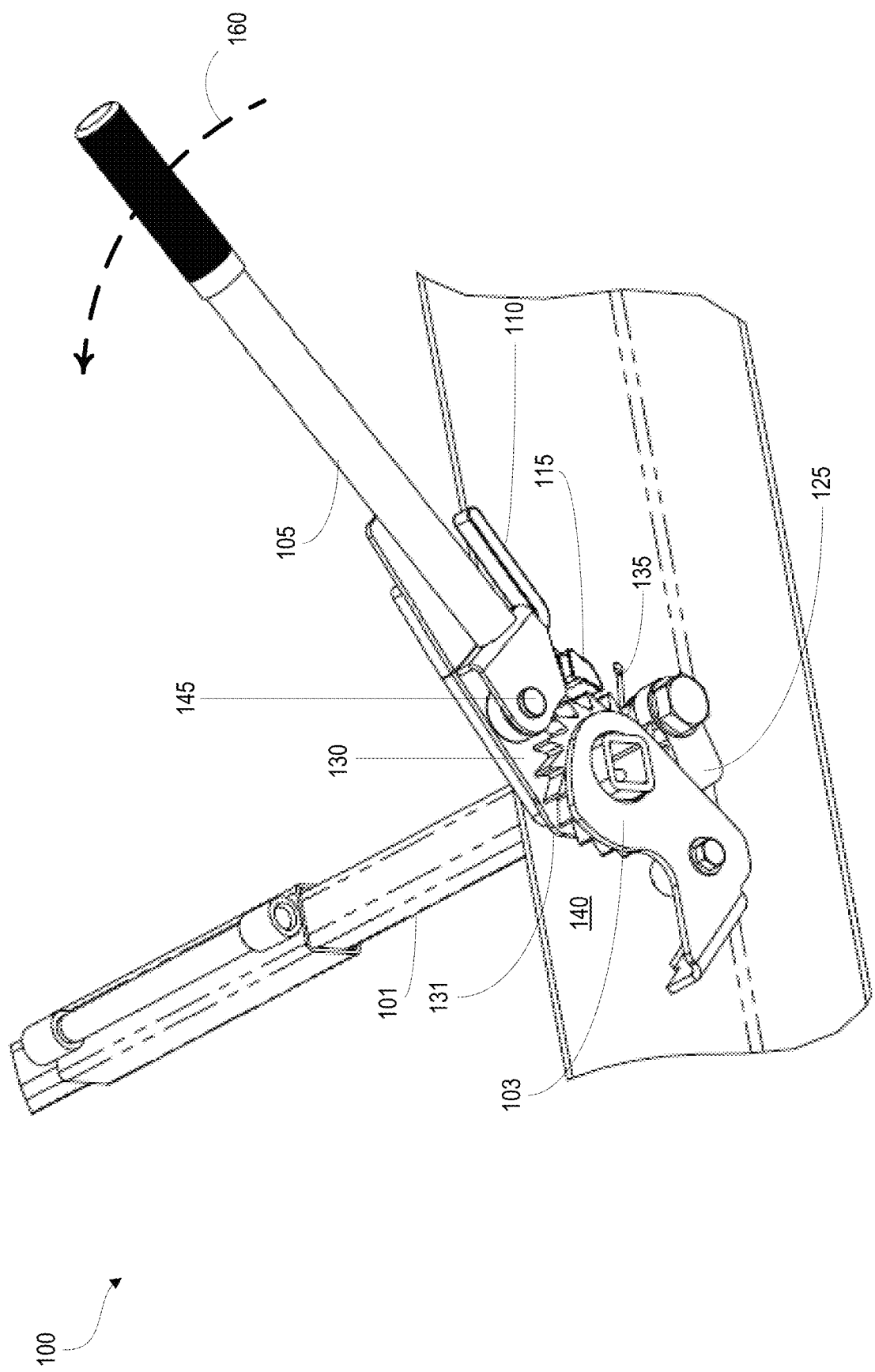
Figure 3C:
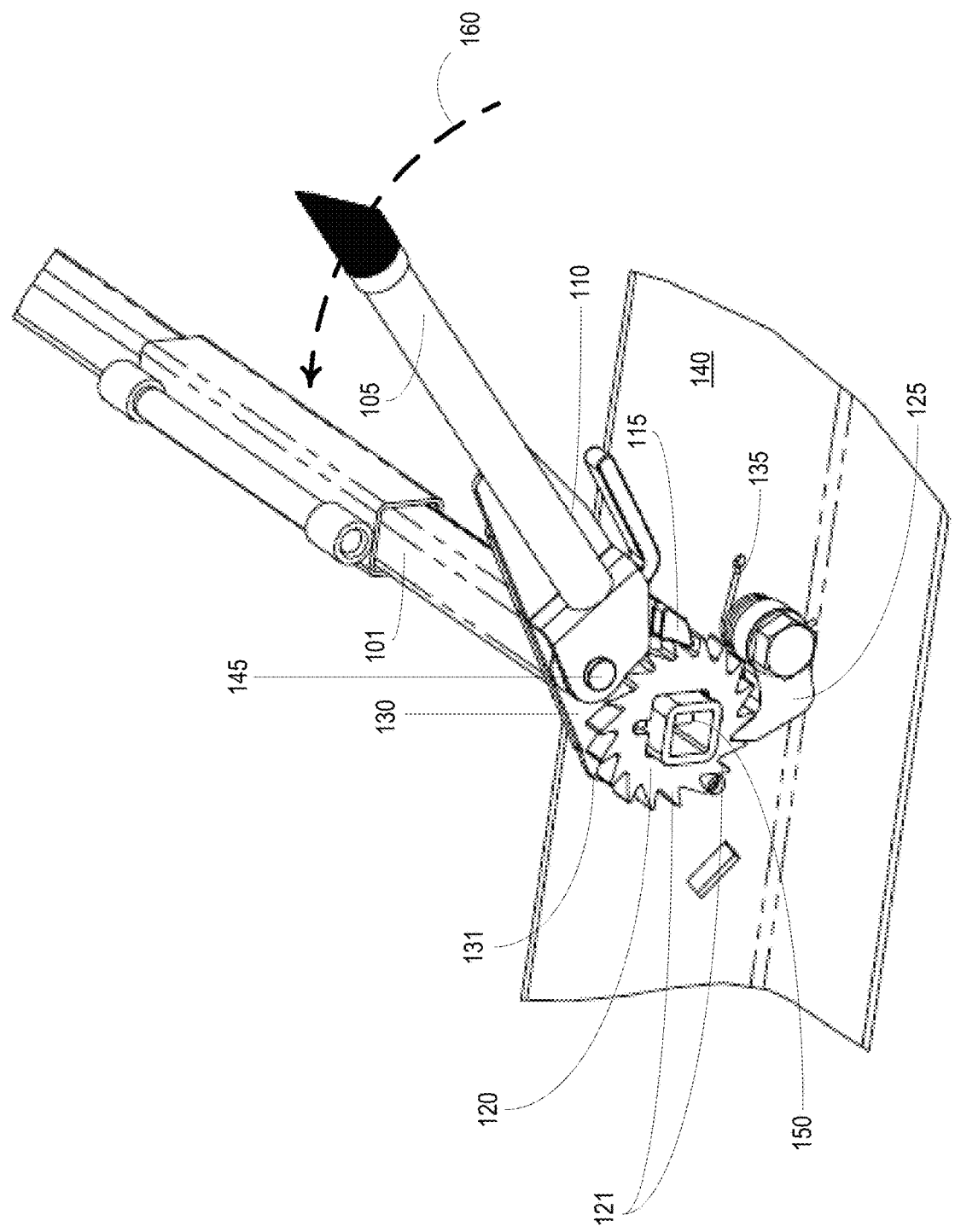

FIGS. 3A-3C illustrate the exemplary embodiment of the ratchet device illustrated in FIG. 1 in a repositioning state, where FIG. 3A is depicted with hidden lines, FIG. 3B is depicted without hidden lines, and FIG. 3C is depicted with the handle pawl disengagement plate removed. As can be seen in the FIG. 3 illustrations, the handle pawl 115 is in a disengaged position and the handle 105 in receipt of a counterclockwise force 160. Briefly referring back to the FIG. 2 illustrations, with the ratchet device 100 in a ratcheting state, the handle pawl 115 was engaged with one of the teeth 121 of the cogwheel 120. A clockwise force 155 (see FIG. 2) would continue to cause the cogwheel 120 to rotate in a clockwise direction with the primary pawl 125 advancing tooth by tooth to prevent any substantial counterclockwise rotation of the cogwheel 120 that might loosen a tensioning member attached to the rotatable shaft 101.

Returning to the FIG. 3 illustrations, rotation of the handle 105 in a counterclockwise direction via counterclockwise force 160 will cause the spring-loaded handle pawl 115 to serially disengage and engage teeth of cogwheel 120. Notably, as the handle 105 and primary pawl disengagement plate 130 are rotated in a counterclockwise direction, a pawl disengagement feature 131 of the primary pawl disengagement plate 130 advances toward the primary pawl 125. At the same time, and similarly, the handle pawl 115 advances toward a cam feature of the handle pawl disengagement plate 103. In this repositioning state, the primary pawl 125 remains engaged with a tooth of cogwheel 120 such that the rotatable shaft 101 is prevented from rotating and loosening a tension member anchor thereto.

For further clarity regarding the FIG. 3 illustrations, the handle disengagement lever 110 may be depressed, thereby retracting the handle pawl 115 from the teeth of cogwheel 120, although such is not necessary in order to advance the handle 105 in a counterclockwise direction. With the handle disengagement lever 110 depressed, however, the handle 105 may be freely rotated counterclockwise or, alternatively, clockwise to a new position (advantageously returning the handle 105 to the transport state). The cogwheel 120 would remain in a fixed position as dictated by primary pawl 125. Even so, it is envisioned that when the ratchet device 100 is being used in its ratcheting state, a user may opt to not depress disengagement lever 110 when rotating the handle 105 counterclockwise as doing so is unnecessary for repositioning the handle pawl 115 to a different tooth of cogwheel 120, as would be understood by one of ordinary skill in the art (i.e., the spring 111 that urges handle pawl 115 toward the teeth may serially retract and extend as the handle pawl 115 advances tooth by tooth). Notably, the primary pawl 125 remains engaged in the teeth of the cogwheel 120 when the ratcheting device 100 is in a ratcheting state, whether the handle disengagement lever 110 is depressed or not, thereby securing the rotatable shaft in position and preventing a tensioning member secured to the shaft from loosening. Advantageously, a primary pawl disengagement plate 130 affixed to the handle 105 is also rotated counterclockwise when the handle 105 is rotated counterclockwise. The handle 105 and primary pawl disengagement plate 130 continue advancing counterclockwise through a substantially 180-degree arc and toward the primary pawl 125. Simultaneously, the handle pawl 115 also advances toward handle pawl disengagement plate 103. Advantageously, at any point during the repositioning state prior to the primary pawl disengagement feature 131 contacting the primary pawl 125, a change in the rotation of the handle from counterclockwise to clockwise will restore the engagement of handle pawl 115 with teeth 121 of cogwheel 120 and resume the ratcheting state described previously and illustrated in FIGS. 2A-2C.

Figure 4A:
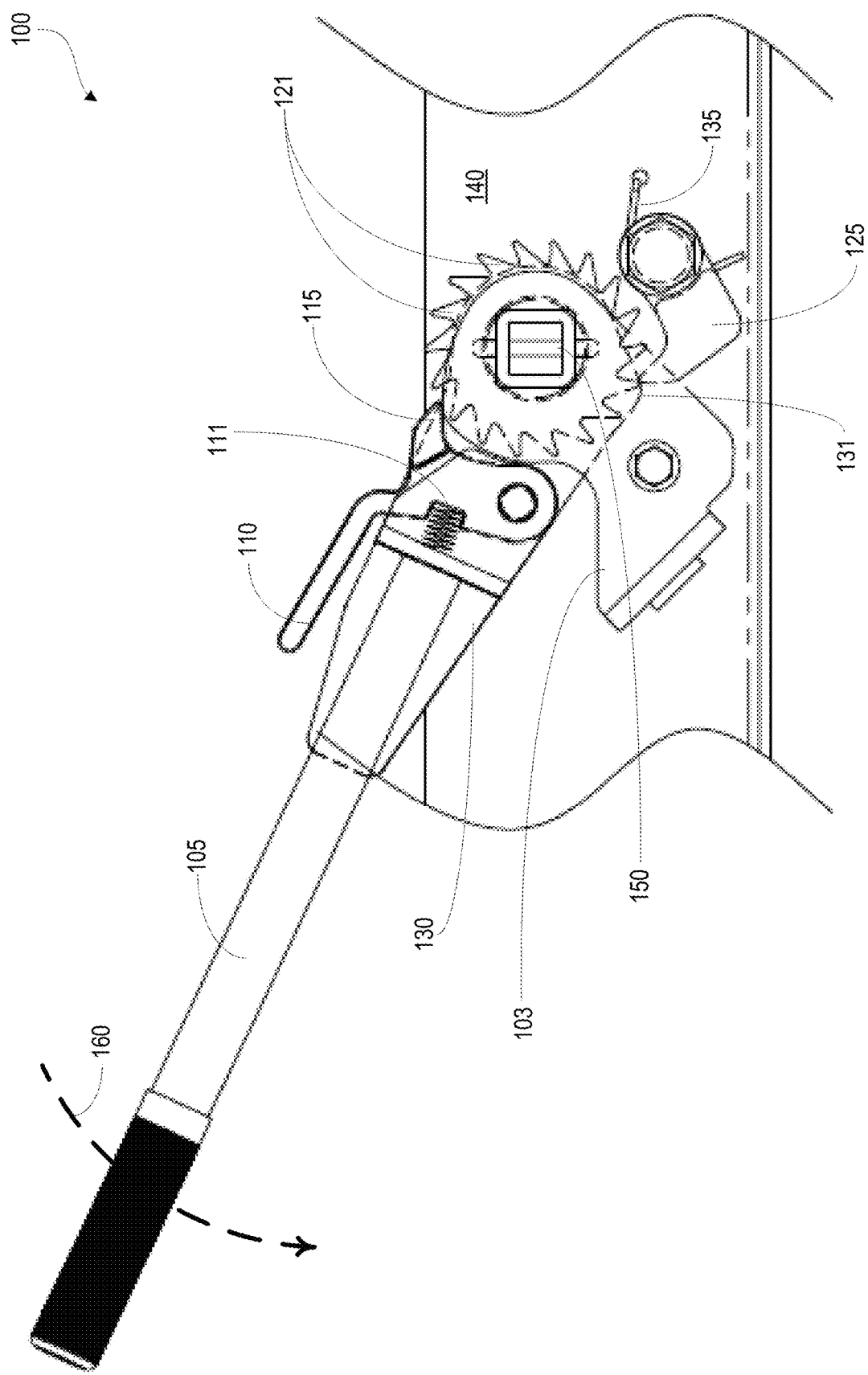
FIGS. 4A-4C illustrate the exemplary embodiment of the ratchet device illustrated in FIG. 1 in a near complete transition from a repositioning state to a free-to-rotate state, where
Figure 4B:
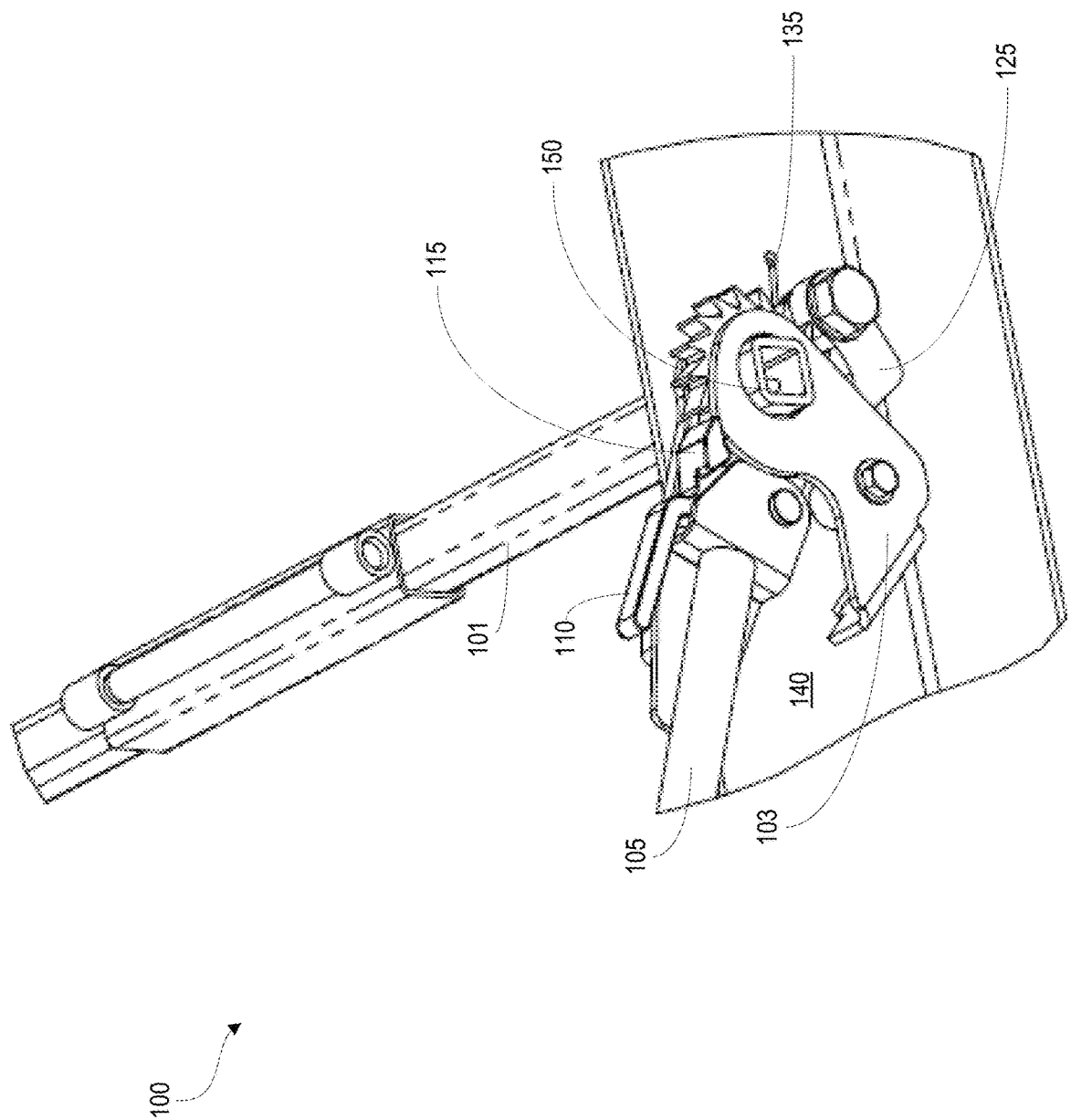
Figure 4C:
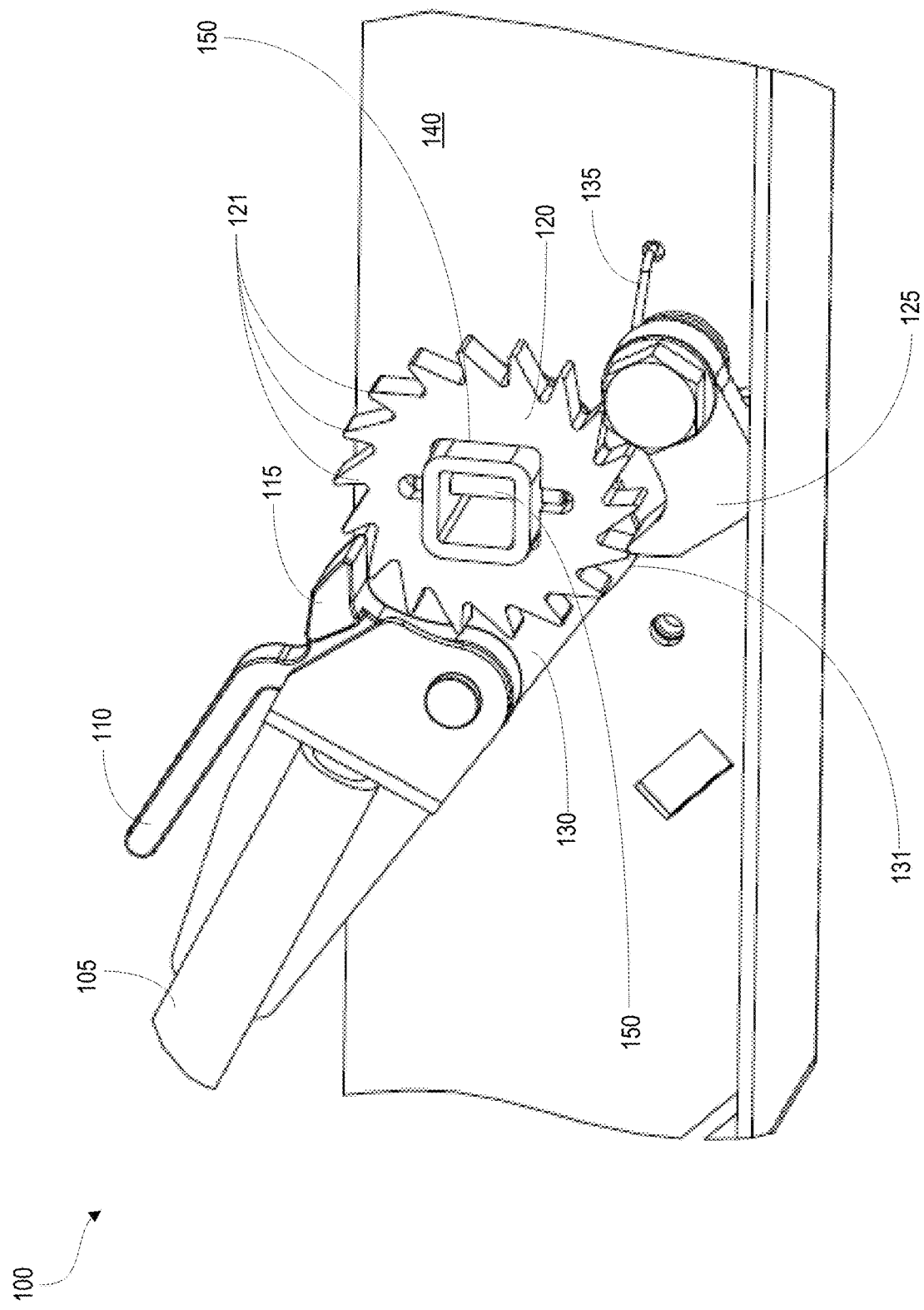

FIGS. 4A-4C illustrate the exemplary embodiment of the ratchet device illustrated in FIG. 1 in a near complete transition from a repositioning state to a free-to-rotate state, where FIG. 4A is depicted with hidden lines, FIG. 4B is depicted without hidden lines, and FIG. 4C is depicted with the handle pawl disengagement plate 103 removed. In the FIG. 4 illustrations, the handle 105 has been rotated counterclockwise to a point that the handle pawl 115 has been fully disengaged from the teeth 121 of cogwheel 120 through contact with the handle pawl disengagement plate 103 while the primary pawl disengagement plate 130 has contacted the primary pawl 125 and initiated its similar disengagement from the teeth 121 of cogwheel 120.

Briefly referring back to the FIG. 3 illustrations, the pawl disengagement feature 131 of the primary pawl disengagement plate 130 can be seen approaching the primary pawl 125 that remains engaged with a tooth of cogwheel 120. In the FIG. 4 illustrations, the pawl disengagement feature 131 of the primary pawl disengagement plate 130 has contacted the primary pawl 125 and initiated the primary pawl's disengagement from the teeth 121 of cogwheel 120. At the same time, the handle pawl 115 has already contacted the handle pawl disengagement plate 103 such that handle pawl 115 is fully disengaged from the teeth of cogwheel 120.

FIGS. 5A-5C illustrate the exemplary embodiment of the ratchet device illustrated in FIG. 1 in a fully disengaged, free-to-rotate state, where FIG. 5A is depicted with hidden lines, FIG. 5B is depicted without hidden lines, and FIG. 5C is depicted with the handle pawl disengagement plate 103 removed. As can be understood from the illustrations, the counterclockwise force 160 on handle 105 has caused the pawl disengagement feature 131 to contact primary pawl 125 and cause it to retract from engagement with the teeth 121 of cogwheel 120. The pawl disengagement plate 130, when in the position shown in the FIG. 5 illustrations, prevents the primary pawl 125 from engaging the teeth 121 of cogwheel 120 as the spring 135 urges the primary pawl 125 onto the pawl disengagement plate 130. Similarly, the handle pawl disengagement plate 103 keeps the handle pawl 115 from engaging with teeth 121 of the cogwheel 120. With the handle pawl 115 and primary pawl 125 disengaged from the cogwheel 120, the cogwheel 120 may be freely rotated in order to loosen a tensioning member affixed to the rotatable shaft 101.

To reengage the handle pawl 115 and return the ratchet device to a ratcheting state, the handle 105 need only to be returned along the 180-degree arc in a clockwise motion, thereby allowing the handle pawl 115 to reengage with the teeth of the cogwheel 120. This can be done by actuating the handle disengagement lever 110 and rotating the handle 105 in a clockwise direction until the handle pawl 115 is disengaged from contact with the plate 103. Moreover, with the handle 105 returned in a clockwise direction, the primary pawl disengagement plate 130 will have been removed from contact with the primary pawl 125, thereby allowing the ratchet device 100 to return to its ratcheting state when the primary pawl 125 reengages with the teeth 121 of the cogwheel 120. Advantageously, when use of the ratchet device 100 has been completed, the handle disengagement lever 110 may be depressed, thereby disengaging the handle pawl 115 from the cogwheel teeth 120 and allowing the handle 105 to be freely rotated clockwise to a storage position (e.g. at the 3-o'clock position) without disturbing the primary pawl 125.

Systems, devices and methods for a ratchet device have been described using detailed descriptions and drawings of embodiments thereof that are provided by way of example and are not intended to limit the scope of the disclosure. The described embodiment comprises different features, not all of which are required in all embodiments of the solution disclosed. Some embodiments of the solution utilize only some of the features or possible combinations of the features disclosed herein. Variations of embodiments of the solution that are described and embodiments of the solution comprising different combinations of features noted in the described embodiment will occur to persons skilled in the art. For example, references to clockwise and counterclockwise functionality will not suggest that embodiments of the solutions are limited to such arrangements. Similarly, one of ordinary skill in the art will appreciate that embodiments of the solutions are not limited in "handedness," i.e., the disclosure herein is fully enabling of both left-hand and right-hand configurations and, as such, the scope of the solution will not be limited by the particular handedness of the exemplary embodiment shown and described. And so, it will be appreciated by persons skilled in the art that systems, devices and methods for a ratchet device according to the solution are not limited by what has been particularly shown and described herein above.

What is claimed is:

1. A ratcheting device, the device comprising:
   a rotatable cogwheel comprising a plurality of teeth;
   a spring-loaded primary pawl positioned to engage any one of the plurality of teeth of the rotatable cogwheel, wherein when the spring-loaded primary pawl is engaged with the plurality of teeth of the rotatable cogwheel the ratcheting device is in a ratcheting state and when the spring-loaded primary pawl is disengaged from the plurality of teeth of the rotatable cogwheel the ratcheting device is in a free-to-rotate state;
   a spring-loaded handle pawl positioned to engage the plurality of teeth of the rotatable cogwheel;
   a handle comprising a handle pawl disengagement lever, wherein actuation of the handle pawl disengagement lever causes the spring-loaded handle pawl to disengage from the plurality of teeth of the rotatable cogwheel;
   a primary pawl disengagement plate comprising a primary pawl disengagement feature, wherein the primary pawl disengagement plate is mechanically coupled to the handle; and
   a handle pawl disengagement plate comprising a handle pawl disengagement feature;
   wherein the handle may be rotated around the cogwheel such that:
      the primary pawl disengagement feature of the primary pawl disengagement plate contacts the spring-loaded primary pawl and causes it to disengage from the plurality of teeth of the rotatable cogwheel; and the handle pawl disengagement feature of the handle pawl disengagement plate contacts the spring-loaded handle pawl and causes it to disengage from the plurality of teeth of the rotatable cogwheel.

2. The ratcheting device of claim 1, further comprising a back plate configured for mounting the ratcheting device to a structure.

3. The ratcheting device of claim 1, wherein a spring operable to cause the spring-loaded handle pawl to engage the plurality of teeth of the rotatable cogwheel is configured to reside substantially within the handle.

4. The ratcheting device of claim 1, wherein transition of the ratcheting device from the ratcheting state to the free-to-rotate state may be accomplished without rotating the handle beyond a 180-degree arc.

5. The ratcheting device of claim 1, further comprising a rotatable shaft mechanically engaged to the cogwheel such that a longitudinal axis of the rotatable shaft is substantially perpendicular to a plane defined by the cogwheel.

* * * * *